United States Patent [19]
Chen

[11] Patent Number: 5,863,134
[45] Date of Patent: Jan. 26, 1999

[54] BEARING WITHOUT CONTACTING FAST SPINNING SHAFT

[75] Inventor: Lee-Long Chen, Taoyuan Hsien, Taiwan

[73] Assignee: Delta Electronics, Inc., Taoyuan Hsien, Taiwan

[21] Appl. No.: 902,646

[22] Filed: Jul. 30, 1997

[51] Int. Cl.$^6$ ..................................................... F16C 32/06
[52] U.S. Cl. ........................... 384/118; 384/100; 384/114
[58] Field of Search .................................. 384/100, 107, 384/111, 114, 118, 113, 115, 119, 120, 286, 291

[56] References Cited

U.S. PATENT DOCUMENTS

| | | | |
|---|---|---|---|
| 3,276,676 | 10/1966 | Buske | 384/100 |
| 3,494,674 | 2/1970 | Muijderman et al. | 384/113 |
| 3,604,770 | 9/1971 | Peltier et al. | 384/286 |
| 4,302,060 | 11/1981 | Nicholas et al. | 384/111 |
| 4,747,705 | 5/1988 | Agrawal | 384/118 |
| 5,270,737 | 12/1993 | Nakasugi et al. | 384/107 X |

Primary Examiner—Thomas R. Hannon
Attorney, Agent, or Firm—Lackenbach Siegel Marzullo Aronson & Greenspan

[57] ABSTRACT

To achieve an efficacy of allowing a shaft to spin in high speed without contacting the bearing in which the shaft is seated, a bearing is configured to comprise an inner ring which includes: at least two slant arc surface zones each spaced out from the surface of the shaft with a gap shrinking, in the spinning direction of the shaft, to a thickness approximately equal to a preset minimum value. The bearing may also be configured to further comprise at least two circular arc surface zones each spaced out from the surface of the shaft with a gap having a thickness approximately equal to the preset minimum value, each of the circular arc surface zones being seated between two of the slant arc surface zones, whereby the liquid substance in the gap between the shaft and the inner ring of the bearing is expelled, when the shaft is spinning, to flow through the gap of smaller thickness or the part of the gap which is between the shaft and the circular arc surface zones, thereby the shaft doesn't have to contact the bearing when it spins with high speed.

26 Claims, 2 Drawing Sheets

BEARING WITHOUT CONTACTING FAST SPINNING SHAFT

FIELD OF THE INVENTION

The present invention relates to a bearing for accommodating a shaft to spin, and particularly to the inner ring structure of a bearing for allowing a shaft to spin fast without contacting the bearing.

BACKGROUND OF THE INVENTION

To reduce the friction between a bearing and a shaft spinning therein, a variety of bearing structures had been developed by suppliers and tried by industries. The practical experience in applying these bearing structures as well as the evolving requirements for spinning operation of a shaft, however, leaves users in the hope of a new bearing structure for effectively reducing the friction between a shaft and a bearing.

SUMMARY OF THE INVENTION

An object of the present invention is to provide a bearing structure for effectively reducing its friction with the shaft spinning therein.

Another object of the present invention is to provide a bearing structure for preventing the fluid substance (lubricant, for instance) in the gap between the bearing and the shaft spinning therein from spilling, and for conveniently filling the fluid substance in the gap.

A preferable embodiment of the present invention may be a bearing comprising an inner ring which includes: at least two slant arc surface zones each spaced out from the surface of the shaft with a slant gap gradually changing in thickness in the spinning direction of the shaft. Specifically the slant gap may gradually decrease in thickness in the spinning direction of the shaft.

The structure may be so configured that the slant arc surface zones span approximately the same sectoral angle around the spinning axis of the shaft, and the sectoral angles spanned by all the slant arc surface zones sum up to approximately equal 360 degrees.

The bearing according to the present invention may further comprise at least two circular arc surface zones each spaced out from the surface of the shaft with a circular gap of a specific thickness, each of the circular arc surface zones being seated between two of the slant arc surface zones. The magnitude of the specific thickness may approximately equal a constant.

Obviously the structure may be so configured that the slant gap gradually decreases in thickness in the spinning direction of the shaft until the thickness of the slant gap has a magnitude approximately equal to the constant.

Another aspect of the embodiment according to the present invention may be a bearing having an inner ring which comprises at least two slant arc surface zones each spaced out from a reference line with a first distance gradually changing in the spinning direction of the shaft, the reference line lying in an axial direction of the shaft. The first distance gradually decreases in the spinning direction of the shaft. The slant arc surface zones span approximately the same sectoral angle around the reference line and the sectoral angles spanned by all the slant arc surface zones sum up to approximately equal 360 degrees. The bearing according to this aspect of the present invention may further comprise at least two circular arc surface zones each spaced out from the reference line with a specific distance, each of the circular arc surface zones being seated between two of the slant arc surface zones. The specific distance may approximately equal a constant length. The first distance according to this aspect of the present invention may gradually decrease in the spinning direction of the shaft until the first distance approximately equals the constant length. The circular arc surface zones span approximately the same sectoral angle around the reference line, and the sectoral angles spanned by all of the circular arc surface zones and all of the slant arc surface zones sum up to approximately equal 360 degrees.

It can be seen a better scheme to embody the present invention is that the number of the circular arc surface zones is equal to the number of the slant arc surface zones.

A bearing which is structured to have such an inner ring can be marketed to meet customized applications where users may integrate the bearing together with devices such as shafts or with material such as lubricant, to achieve the efficacy of allowing a shaft to spin fast without contacting the bearing. For example, in case a shaft is seated in the space enclosed by such an inner ring of a bearing, and lubricant is filled in the gap between the shaft and the inner ring, the lubricant will be expelled to flow through the circular gap (the gap between the surface of the shaft and the arc surface zones, which is usually smaller than the whole range of the slant gap that is between the surface of the shaft and the slant arc surface zones) when the shaft spins fast, thereby the shaft will have no contact with the circular arc surface zones, much less with the slant arc surface zones, whereby when the shaft spins fast the friction between the shaft and the bearing can be enormously reduced, and an operation without friction may be practically expected.

Although it is better that the circular arc surface zones span the same sectoral angle around the spinning axis of the shaft (or around the reference line), and the slant arc surface zones also span the same sectoral angle around the spinning axis of the shaft or around the reference line, the present invention is not limited to the configuration. It must be noticed that the size of the circular arc surface zones or the sectoral angle of the circular arc surface zone is not limited to any specification, it can be so small that the structure may be deemed to include only the slant arc surface zones as long as the structure is configured to let the shaft spin steadily.

The present invention may best be understood through the following description with reference to the accompanying drawings, in which:

DETAILED DESCRIPTION OF THE PREFERRED EMBODIMENTS

Figure 1:
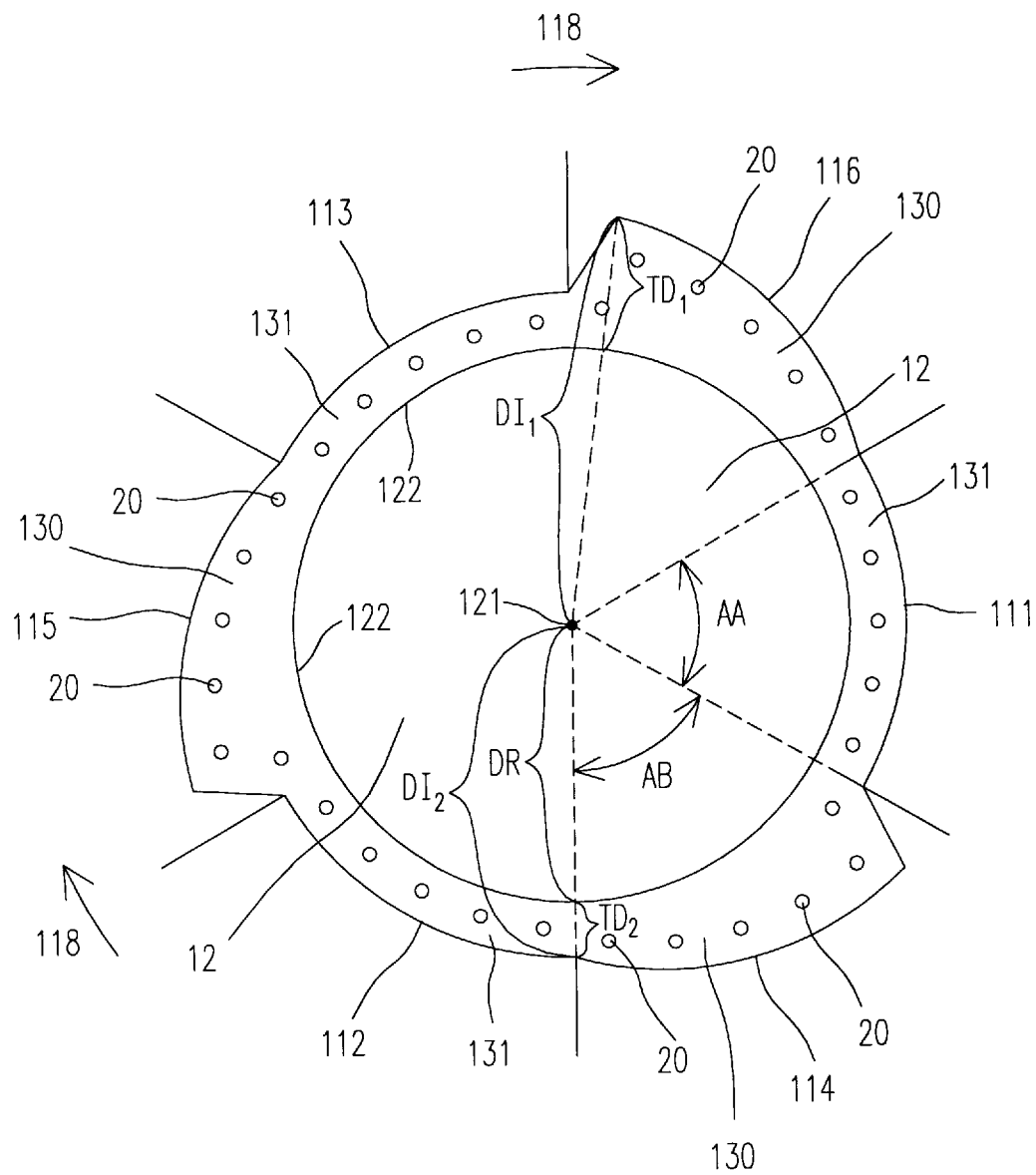
FIG. 1 is a sectional view of the space enclosed by the inner ring (observe from external along the axial direction of the shaft seated in the space) of a preferable embodiment of a bearing according to the present invention.

In FIG. 1, a shaft 12 is enclosed by a bearing's inner ring which includes: three slant arc surface zones 114, 115, 116 each spaced out from the surface 122 of the shaft 12 with a gap 130 which gradually shrinks, in the spinning direction (indicated by the arrow 118, for example, in the embodiment shown in FIG. 1) of shaft 12, from a larger thickness (TD1 shown in FIG. 1 for example) to a smaller thickness TD2;

and three circular arc surface zones 111, 112, 113 each spaced out from the surface 122 of the shaft 12 with a gap 131 of a thickness TD2, each circular arc surface zone is seated between two of the slant arc surface zones, such as that shown in FIG. 1 by the arrangement of 111, 114, 112, 115, 113, and 116 in clockwise direction. Another aspect of the embodiment is that the inner ring comprises three circular arc surface zones 111, 112, 113 each in the shape of a circular arc relative to a reference line 121 (may coincide with the spinning axis of shaft 12) lying in the axial direction of the shaft, and each spaced out from the reference line 121 with a distance approximately equal to a certain length DI2; and three slant arc surface zones each spaced out from the reference line with a distance gradually shrinking, in the spinning direction of the shaft, from a larger length (DI1 for example) to a smaller length approximately equal to the certain length DI2, each circular surface zone is seated between two of the slant arc surface zones, as shown in the figure by the arrangement of 111, 114, 112, 115, 113, and 116 in clockwise direction. It can be seen that a bearing structured to have such an inner ring can be marketed as a unit to meet customized applications where users may integrate the bearing together with devices such as shafts 12 and with material such as fluid substance 20 (filling in the gap 130 and 131 which is between shaft 12 and the inner ring of the bearing), to achieve the efficacy of allowing a shaft to spin fast without contacting the bearing. In FIG. 1, for example, the fluid substance 20 filling in the gap 130 and 131 between shaft 12 and the inner ring 111, 114, 112, 115, 113, and 116 of the bearing will be expelled to flow along the circular arc surface zones 111, 112, and 113 when the shaft spins fast in clockwise direction, thereby shaft 12 will have no contact with the circular arc surface zones, much less with the slant arc surface zones, whereby when the shaft spins fast the friction between shaft 12 and the bearing can be enormously reduced, and an operation without friction may be practically expected.

It must be noticed that the size of the circular arc surface zones 111, 112, and 113, or the sectoral angle AA of the circular arc surface zone is not limited to any specification, it can be so small that the structure may be deemed to include only the slant arc surface zones 114, 115, 116 as long as the structure is configured to let the shaft spin steadily.

A better scheme to embody the present invention is to design the structure in such a way that the circular arc surface zones 111, 112, and 113 span approximately the same sectoral angle AA around the spinning axis of the shaft 12 (or around the reference line 121), and the slant arc surface zones 114, 115, and 116 also span the same sectoral angle AB around the spinning axis of the shaft 12 or around the reference line 121.

It is suggested that the sectoral angles AA spanned by all of the circular arc surface zones 111, 112, and 113 and the sectoral angles AB spanned by all of the slant arc surface zones sum up to approximately equal 360 degrees (one circle), and the number (3 in this case) of the circular arc surface zones is equal to the number (3 in this case) of the slant arc surface zones.

Figure 2:
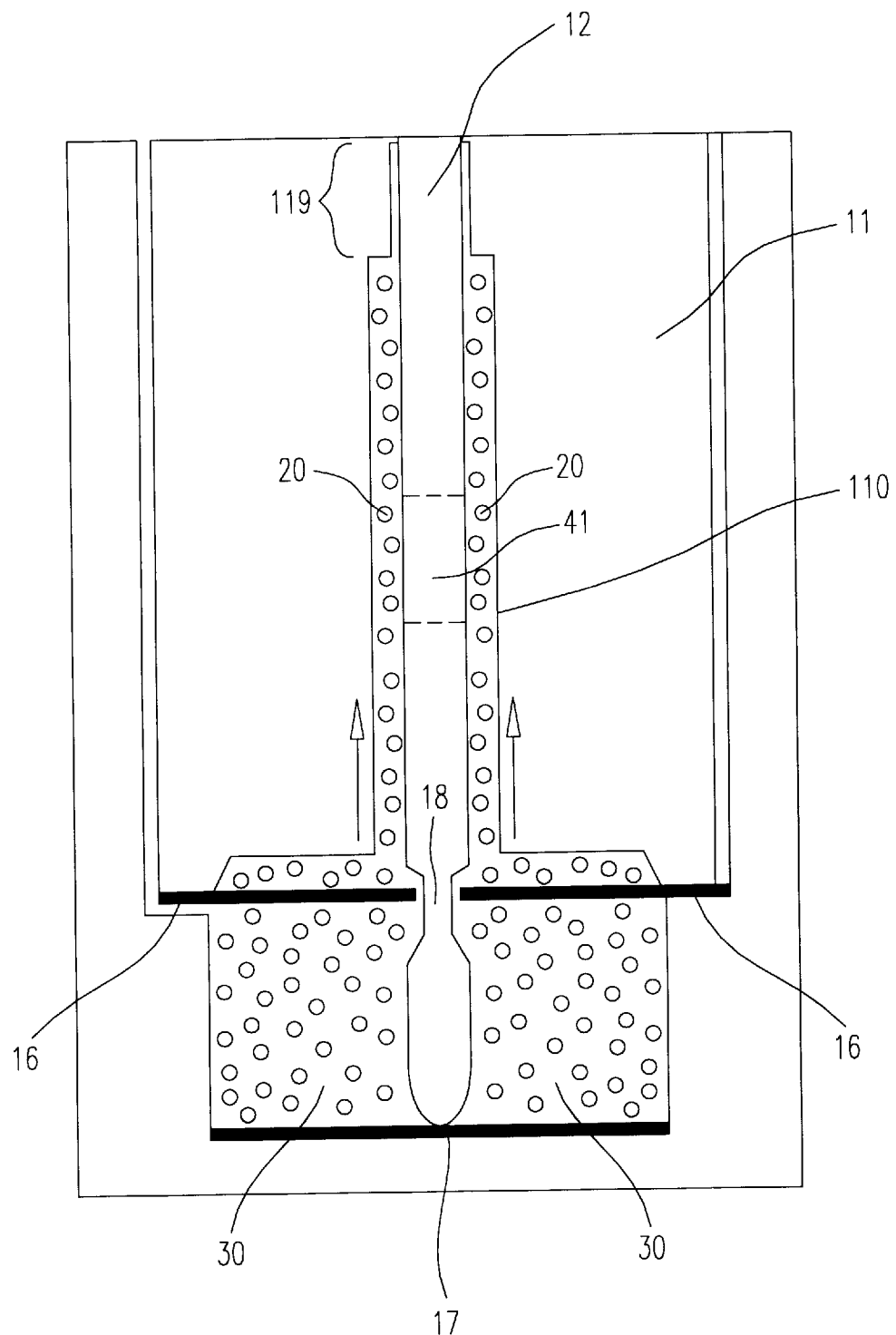
FIG. 2 is a side view of the preferable embodiment of the bearing with a shaft seated in the space enclosed by the inner ring thereof.

In FIG. 2, around the exit 119 of the space enclosed by the bearing' inner ring which is composed of circular arc surface zones (111, 112, and 113 shown in FIG. 1) and slant arc surface zones (114, 115, and 116 shown in FIG. 1), a screw thread structure is further comprised within the inner ring of the bearing for preventing the fluid substance from spilling out. It can be realized the screw thread structure may be configured to screw, in the spinning direction of the shaft, toward the middle portion (denoted by 41 in FIG. 2) of the space enclosed by the inner ring of the bearing, thereby the fluid substance 20 around the shaft (in the gap defined by the surface of the shaft and the inner ring) is driven, when the shaft spins, to flow toward the portion 41 of the space, whereby the spilling of the fluid substance 20 from exit 119 of the space can be prevented. The bearing embodied according to the present invention may further comprise, around the exit opposite to exit 119, a container 30 for containing liquid substance (such as lubricant) to be absorbed to fill in the gap (denoted by 130 and 131 in FIG. 1) between the shaft 12 and the inner ring of the bearing. The liquid substance between the shaft 12 and the inner ring of the bearing is represented by circles 20 in FIG. 1 and FIG. 2. Also shown in FIG. 2 is a fastener 16 stretching into a gap defined, around the exit (opposite to exit 119 shown in FIG. 2), by a depression (denoted by 18 in FIG. 2) of the shaft accommodated in the space, whereby the fastener 16 can prevent the shaft from being displaced while avoid contacting the shaft which is regularly accommodated in the space. A wear washer is also included in the container's bottom with seating location denoted by 17 shown in FIG. 2. The wear washer is to provide a wear resistant contact in case the shaft needs to be supported by the bottom of the container.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bearing for accommodating a shaft to spin in the space enclosed therein comprising an inner ring which includes at least two slant arc surface zones each spaced out from the surface of said shaft with a slant gap gradually changing in thickness in the spinning direction of said shaft; and at least two circular arc surface zones each spaced out from the surface of said shaft with a circular gap of a specific thickness, and each said circular arc surface zone being seated between two of said slant arc surface zones.

2. The bearing according to claim 1 wherein said slant gap gradually decreases in thickness in the spinning direction of said shaft.

3. The bearing according to claim 1 wherein said slant arc surface zones span approximately the same sectoral angle around the spinning axis of said shaft, and said sectoral angles spanned by all said slant arc surface zones sum up to approximately equal 360 degrees.

4. The bearing according to claim 1 wherein said specific thickness approximately equals a constant length.

5. The bearing according to claim 4 wherein said slant gap gradually decreases in thickness in the spinning direction of said shaft until the thickness of said slant gap approximately equals said constant length.

6. The bearing according to claim 1 wherein said circular arc surface zones span approximately the same sectoral angle around the spinning axis of said shaft.

7. The bearing according to claim 6 wherein said sectoral angles spanned by all of said circular arc surface zones and all of said slant arc surface zones sum up to approximately equal 360 degrees.

8. The bearing according to claim 1 wherein the number of said circular arc surface zones is equal to the number of said slant arc surface zones.

9. The bearing according to claim 1 wherein said slant gap and said circular gap are filled with fluid substance, and said inner ring further comprises, around an exit of said space, a screw thread structure for preventing said fluid substance from spilling out of said slant gap and said circular gap.

10. The bearing according to claim 9 further comprising a container for containing said fluid substance to be absorbed to fill in said slant gap and said circular gap.

11. The bearing according to claim 10 wherein said container includes a wear washer on the bottom thereof for supporting said shaft and providing wear resistance.

12. The bearing according to claim 9 wherein said fluid substance is liquid lubricant.

13. The bearing according to claim 1 further comprising, around an exit of said space, a fastener stretching into a gap defined, around said exit, by a depression of said shaft accommodated in said space, whereby said fastener can prevent said shaft from being displaced while avoid contacting said shaft which is regularly accommodated in said space.

14. A bearing for accommodating a shaft to spin in the space enclosed therein comprising an inner ring which includes at least two slant arc surface zones each spaced out from a reference line with a first distance gradually changing in the spinning direction of said shaft, said reference line lying in the axial direction of said shaft; and at least two circular arc surface zones each spaced out from said reference line with a specific distance, and each said circular arc surface zone being seated between two of said slant arc surface zones.

15. The bearing according to claim 14 wherein said first distance gradually decreases in the spinning direction of said shaft.

16. The bearing according to claim 14 wherein said slant arc surface zones span approximately the same sectoral angle around said reference line and said sectoral angles spanned by all said slant arc surface zones sum up to approximately equal 360 degrees.

17. The bearing according to claim 14 wherein said specific distance approximately equals a constant length.

18. The bearing according to claim 17 wherein said first distance gradually decreases in the spinning direction of said shaft until said first distance approximately equals said constant length.

19. The bearing according to claim 14 wherein said circular arc surface zones span approximately the same sectoral angle around said reference line.

20. The bearing according to claim 19 wherein said sectoral angles spanned by all of said circular arc surface zones and all of said slant arc surface zones sum up to approximately equal 360 degrees.

21. The bearing according to claim 14 wherein the number of said circular arc surface zones is equal to the number of said slant arc surface zones.

22. The bearing according to claim 14 wherein the gap between said shaft and said inner ring is filled with fluid substance, and said inner ring further comprises, around an exit of said space, a screw thread structure for preventing said fluid substance from spilling out of said gap.

23. The bearing according to claim 22 further comprising a container for containing said fluid substance to be absorbed to fill in said gap.

24. The bearing according to claim 23 wherein said container includes a wear washer on the bottom thereof for supporting said shaft and providing wear resistance.

25. The bearing according to claim 22 wherein said fluid substance is liquid lubricant.

26. The bearing according to claim 14 further comprising, around an exit of said space, a fastener stretching into a gap defined, around said exit, by a depression of said shaft accommodated in said space, whereby said fastener can prevent said shaft from being displaced while avoid contacting said shaft which is regularly accommodated in said space.

* * * * *